United States Patent Office 3,497,542
Patented Feb. 24, 1970

3,497,542
PERCHLORINATED AROMATIC POLYISO-CYANATES PREPARATION
Strong K. Gardner, North Haven, Ehrenfried H. Kober, Hamden, and Wilhelm J. Schnabel, Branford, Conn., assignors to Olin Mathieson Chemical Corporation, a corporation of Virginia
No Drawing. Filed July 27, 1965, Ser. No. 475,275
Int. Cl. C07c *119/04;* C08g *22/18;* C07b *9/00*
U.S. Cl. 260—453
8 Claims

ABSTRACT OF THE DISCLOSURE

Perchlorinated aromatic polyisocyanates are prepared by reacting chlorine with an aromatic polyisocyanate. The reaction is conducted in the presence of an inert organic solvent having a boiling point higher than that of the perchlorinated aromatic polyisocyanate formed and in the presence of a catalyst such as ferric chloride.

---

This invention relates to perchlorinated aromatic polyisocyanates and to a method of preparing these products. More particularly, this invention in one phase, relates to a process for complete substitution of all hydrogen atoms in the nucleus of the aromatic ring of an aromatic polyisocyanate by chlorine in which the chlorination reaction is carried out in the presence of an inert solvent having a boiling point higher than that of the perchlorinated aromatic polyisocyanate formed.

It is known that the utilization of halogenated aromatic isocyanates in polyurethane formulations for the manufacture of rigid and flexible foams, adhesive coatings, abrasion-resistant rubber substitutes, etc. tend to impart enhanced flame resistance, greater stability towards sunlight, and other desirable qualities.

In U.S. Patent 2,915,545 a process for the preparation of polychlorinated aromatic diisocyanates is described in which chlorine is reacted with a melt of an aromatic diisocyanate at elevated temperature (about 180–190° C.) and in the presence of a catalytic quantity of anhydrous ferric chloride. However, only mixtures of products representing various grades of chlorination are obtained. Purification of these mixtures and separation or isolation of uniform products, e.g., trichloro-m-phenylene-diisocyanate and tetrachloro m-phenylene diisocyanate, is very difficult and uneconomical. The chlorination of arylisocyanates can also be conducted in two steps (German Patent 1,157,601). In the first stage, the chlorination is carried out at temperatures between 50–100° C. with or without low boiling solvents being present and in the presence of a catalytic amount of iodine. In the second stage, the temperature is raised to 250° C. and the chlorination is continued in the absence of a solvent and in the presence of a catalyst, such as ferric chloride. This process, however, is of disadvantage in regard to the long chlorination time required to achieve complete perchlorination and with regard to the formation of undesirable by-products, such as carbodiimides, which are formed from the isocyanates upon prolonged heating at temperatures up to 250° C. The isolation of the chlorinated polyisocyanates and their complete separation from the by-products and the catalyst, e.g., by distillation, is difficult especially toward the end of the distillation since the by-products entrap considerable amounts of the chlorinated isocyanate. The distillation residue, a hard mass sticking to the walls of the reactor or the distillation pot, can only be removed with difficulty, but not by simple means such as draining, pouring, or drawing off with suction. It is obvious that the second stage of this process must be conducted batchwise and cannot be adapted to a continuous operation.

We have found that the utilization of high boiling inert solvents during the chlorination of aromatic isocyanates, especially during the second or last stage of the perchlorination of aromatic isocyanates, is more economical since the difficulties and disadvantages which are encountered in the previously discussed methods are avoided.

Suitable solvents for use in this invention include materials which are essentially inert towards chlorination, are liquid at the chlorination temperature, and have a boiling point higher than that of the perchlorinated isocyanate. Materials exhibiting such properties are, e.g., those materials obtained by partial or total chlorination of polynuclear aromatic compounds such as biphenyl, terphenyl, naphthalene, etc. Such compositions are commercially available at low prices (e.g., under the trade name "Aroclor"). The presence of such solvents during the chlorination facilitates mixing, ensures an even distribution of chlorine, provides for the absorption of larger amounts of chlorine in the mixture and thereby results in a considerable increase of the chlorination rate over that experienced in chlorinating without a solvent. Since the boiling points of the utilized solvents are higher than those of the prepared perchlorinated isocyanates, the isolation of the chlorinated isocyanates and their separation from the solvents can easily be conducted by vacuum distillation, leaving solvent and catalyst as a liquid pot residue which can be recycled to the chlorination reactor if desired. Thus this novel process can be adapted easily to a continuous operation. During the recovery of the chlorinated isocyanate by vacuum distillation, the solvent materials are effective as chasers thus avoiding overheating of the products and avoiding the formation of by-products by thermal decomposition or polymerization. Also the use of the solvent materials reduces the distillation hold up to a minimum which results in nearly quantitative recoveries of the prepared chlorinated isocyanates.

The amount of the solvent used can vary over a wide range of from about 10 to 1000 percent by weight based on the weight of the isocyanate charged to the chlorination apparatus. The temperature range over which the novel chlorination reaction of this invention can be conducted will generally vary from about 100 to 250° C. If desired, the process can be conducted in two steps employing iodine in the first phase, or it can be conducted in a single step without utilizing iodine as a halogen transferring agent. Amounts of about 0.1–2.0 percent by weight (based on the weight of the polyisocyanate employed) of a catalyst, such as ferric chloride, can be used in this process. Other suitable catalysts include ferric bromide, ferric iodide, aluminum chloride, antimony trichloride, antimony pentachloride, titanium tetrachloride, tin tetrachloride, etc. Although the chlorination is ordinarily conducted at atmospheric pressure, super atmospheric pressures can be utilized, if desired. Conventional types of chlorination equipment can be employed, e.g., a stirred kettle with a gas inlet tube near the bottom, packed or unpacked towers, etc.

Arylisocyanates which can be utilized for the chlorination process are, e.g., p-phenylene diisocyanate, m-phenylene diisocyanate, 2,4-tolylene diisocyanate, 2,6-tolylene diisocyanate, 1-trichloromethyl - 2,4 - phenylene diisocyanate, 4,4'-biphenylene diisocyanate, 4,4',4"-triphenyl methane triisocyanate, 1,5-naphthylene diisocyanate and isomers and mixtures of these compounds.

EXAMPLE I

A mixture of 160 grams (1.0 mol) of m-phenylene diisocyanate, 18.0 grams of chlorinated terphenyl (containing 60 percent chlorine) were charged into a 500 ml., three-neck flask fitted with gas-inlet tube extending to below the liquid level, mechanical stirrer, thermometer and a vertical air condenser. The mixture was heated to about 80° C. and chlorine was introduced at a rate of 1.0–1.2 moles/hr. for a period of five hours. The temperature of the exothermic reaction was controlled by external cooling and was maintained in the range of 100–125° C. The mixture of excess chlorine and hydrogen chloride formed during the reaction was passed through a Dry-Ice trap to remove the chlorine, and the hydrogen chloride gas remaining was passed through a flow meter. When the evolution of hydrogen chloride had ceased, an amount of 1.6 grams of ferric chloride (1.0 percent based on the weight of the charged diisocyanate) was added, and the temperature raised to 220° C. within about one hour while the rate of chlorine addition was maintained at 1.0–1.2 moles per hr. Chlorination was continued for five hours at 220–250° C. and at the end of that time the evolution of hydrogen chloride had practically ceased. At the conclusion of the clorination reaction the reaction mixture contained about 7.37 percent by weight of the chlorinated terphenyl. The temperature of the reaction mixture was lowered to about 130° C. and the mixture was then subjected to a vacuum distillation utilizing a small Vigreux column. A total of 271.6 grams (91.2 percent of theory) of pure tetrachloro-m-phenylene diisocyanate, melting at 75–77° C., NCO-content-28.4 percent, was obtained. The product, as well as the residue, did not contain impurities which were characterized by a carbodiimide structure as was shown by the absence of an infrared absorption band at $4.65\mu$. The liquid distillation residue, consisting essentially of solvent plus catalyst appeared suitable for use with a new charge of m-phenylene diisocyanate in the chlorination reaction.

EXAMPLE II

A mixture of 40 grams (0.25 mol) of m-phenylene diisocyanate and 160 grams of chlorinated biphenyl (containing 68 percent chlorine) was chlorinated as described in Example I. 0.2 gram of ferric chloride (0.5 percent by weight based on charged diisocyanate) was added after the first exothermic phase. The final reaction mixture contained about 70.3 percent by weight of chlorinated biphenyl. Fractional vacuum distillation gave 82 percent of the theoretical yield of pure tetrachloro-m-phenylene diisocyanate.

The reaction mixture containing the perchlorinated aromatic polyisocyanate and the chlorinated polynuclear aromatic solvent can also be utilized directly for the preparation of flame resistant foams by reaction with a polyether polyol such as polypropylene glycol, glycerol, ethoxylated glycerol, sorbitol, propoxylated sorbitol, pentaerythritol, etc. In these cases the chlorinated polynuclear aromatic solvent imparts additional flame resistance to the foam. In some instances, where the percentage of the chlorinated polynuclear aromatic solvent in the reaction mixture is relatively high it may be desirable to add a quantity of a second diisocyanate, such as 2,4-tolylene diisocyanate, 2,6-tolylene diisocyanate, halogenated tolylene diisocyanates and mixtures thereof, in order to control the content of chlorinated polynuclear aromatic solvent within desired limits in the finished foam.

Catalysts such as the tertiary amines, etc. along with blowing agents of the type exemplified by trichlorotrifluoro ethane can be used in preparing polyurethane materials from the perchlorinated aromatic polyisocyanate products of this invention as well as from the reaction mixture containing the chlorinated polynuclear aromatic solvent together with the perchlorinated aromatic polyisocyanate.

The polyether-urethane reaction mixture can also desirably include catalysts and the like, such as tertiary amines etc. Some examples of useful catalysts are N-methylmorpholine, triethyl amine, N,N'-bis(2-hydroxyl propyl) 2-methyl piperazine, dimethyl ethanol amine, tertiary amino alcohols, tertiary ester amines and the like.

Other compounding ingredients can be employed in making the polyurethanes of this invention such as wetting agents, emulsifiers, carbon black, titanium dioxide, mica, wood pulp, silica, color pigments and dyes, paraffin oil, castor oil, silicones, fire resistant materials such as antimony oxide, fungicides, anti-degradants, and the like. If desired, small quantities of water can be added to the mixture to facilitate blowing.

Halogenated tolylene diisocyanates having halogen substitution in the methyl group and diisocyanates having halogen substitution in the methyl group as well as in the aromatic ring can be prepared by chlorinating tolylene diisocyanate in the absence of a solvent or catalyst at a temperature ranging from about 60 to about 150° C. The halogenation may be performed in the presence of ultra violet irradiation although the rate of reaction is the same as when ultra violet is not employed. Chlorine, bromine or mixtures of these halogens, in liquid or gaseous form can be utilized in this method.

Valuable flame resistant polyurethane products can be prepared from these novel halogenated tolylene diisocyanates in the same manner as described previously in connection with urethanes derived from the perchlorinated aromatic polyisocyanates.

The preparation of these novel halogenated tolylene diisocyanates is illustrated in the following examples which are to be considered not limitative.

EXAMPLE III 260.0 grams (1.5 mole) of 2,4-tolylene diisocyanate was chlorinated at 60–72° C. without a catalyst by introducing chlorine at a rate of 1.0–1.5 grams per minute for 2.5 hours. The reaction mixture was rapidly agitated by stirring. A portion of the total amount of this reaction product (13.5 percent by weight) was distilled and the overhead product was found by analysis to be predominantly 5-chloro-2,4-tolylene diisocyanate. The remaining 86.5 percent of the reaction mixture thus produced was further chlorinated, with stirring, at 120–130° C. for 1.5 hours. The rate of chlorine addition was 1.0 gram per minute. After purging with nitrogen, a total of 326 grams of crude product was obtained. Distillation of this product gave 320 grams of material, B.P. 145–157° C. at 1 mm. Hg. A sample of this material was found by nuclear magnetic resonance spectroscopy to consist of 62 parts of $\alpha$-chloro-5-chloro-2,4-tolylene diisocyanate (I), 11 parts of $\alpha,\alpha$-dichloro-5-chloro-2,4-tolylene diisocyanate (II), 4 parts of $\alpha$-chloro-3,5,6-trichloro-2,4-tolylene diisocyanate (III), 6 parts of $\alpha$-chloro-2,4-tolylene diisocyanate, 7 parts of 3,5-dichloro 2,4-tolylene diisocyanate and 10 parts of 2,4-tolylene diisocyanate.

EXAMPLE IV 348.0 grams of 2,4-tolylene diisocyanate (2.0 moles) was chlorinated at 130–140° C. Chlorine was introduced at a rate of approximately 1.3 grams per min. while the isocyanate was agitated by rapid stirring with a laboratory paddle stirrer. After about two hours the temperature was raised to 145–149° C. and chlorination was continued for 240 minutes at the same rate. At this point, the increase in weight of the reaction mixture was 186.6 grams which corresponds to the introduction of 2.7 grams equivalents of chlorine per mole of tolylene diisocyanate. Upon continued chlorination at 145° C. a considerable decrease of the chlorine absorption rate to 0.25 gram per min. and then finally to about 0.119 gram per min. was observed. The chlorine content of 38.8 per cent obtained by elemental (combustion) analysis, was in agreement with a total chlorine up-take of 3.08 gram equivalents per mole of tolylene diisocyanate based on the weight increase. Based on nuclear magnetic resonance spectroscopy, the product contained 29 parts of $\alpha$-chloro-5-chloro-2,4-tolylene diisocyanate (I), 36 parts of $\alpha,\alpha$-dichloro-5-chloro-2,4-tolylene diisocyanate (II), 6 parts of $\alpha$-chloro-3,5,6-trichloro 2,4-tolylene diisocyanate (III), 10 parts of 3,5-dichloro 2,4-tolylene diisocyanate (V), 9 parts of α,α,α-trichloro-2,4-tolylene diisocyanate (VI) and 10 parts of product of unassigned structure.

EXAMPLE V 174 g. of 2,6-tolylene diisocyanate (1.0 mole) was chlorinated by introducing chlorine at a rate of 1.0 gram per min. at 60–65° C. until the chlorine uptake ceased after about three hours. A total of 46.4 g. of chlorine (1.3 gram equivalents per mole) was absorbed. Continued chlorination for an additional 80 min. at 90–95° C. and 30 min. at 125° C. gave a product containing about 28.8 percent of chlorine (according to weight increase) which corresponds to dichlorinated tolylene diisocyanate calculated value (29.18 percent Cl). Fractional distillation gave 222.5 grams (92 percent) of dichlorination product distilling at 105–110° C., 0.1–0.2 mm. Hg. Only 4.0 grams of residue obtained. The colorless distillate solidified at room temperature, M.P. 55–57° C. (from petroleum ether). According to nuclear magnetic resonance spectroscopy the recrystallized product consisted of at least 80 percent of α - chloro - 3 - chloro-2,6-tolylene diisocyanate. The hydrolyzable chlorine content was found to be 13.7 percent or 47 percent of the total chlorine content, indicating that 47 percent of the chlorine atoms were attached to the methyl group and 53 percent of the chlorine atoms were attached to the aromatic nucleus.

EXAMPLE VI 348 grams of a mixture of 80 percent by weight of 2,4-tolylene diisocyanate and 20 percent by weight of 2,6-tolylene diisocyanate was chlorinated at 60–65° C. The rate of introduction of chlorine was 1.5–2.0 grams per minute. The product obtained after a total chlorination time of ten hours showed a chlorine content of 29.7 percent (according to elemental analysis), slightly more than the calculated value for dichloro-tolylene diisocyanate (29.18 percent).

Chlorination of this intermediate product at 100–105° C. for an additional 15 hours gave a product containing 38.3 percent of chlorine according to elemental analysis (calculated for trichloro-tolylene diisocyanate 38.3 percent Cl). The weight increase indicated 2.9 gram equivalents of chlorine had been introduced per mole of tolylene diisocyanate. The content of hydrolyzable chlorine was found to be 20.9 percent indicating that 54.9 percent of the chlorine atoms contained in this product were attached to the methyl group and 45.1 percent of the chlorine atoms were attached to the aromatic nucleus.

What is claimed is:

1. A method for the preparation of a perchlorinated aromatic polyisocyanate which comprises reacting chlorine at a temperature of from about 100 to 250° C. with an aromatic polyisocyanate selected from the group consisting of phenylene diisocyanate, biphenylene diisocyanate and naphthalene diisocyanate, and recovering the perchlorinated aromatic polyisocyanate from the reaction mixture, said reaction being conducted in the presence of a chlorinated polynuclear aromatic solvent having a chlorine content of at least 60 percent by weight and being selected from the group consisting of chlorinated biphenyl, chlorinated terphenyl and chlorinated naphthalene, and having a boiling point higher than that of the perchlorinated aromatic polyisocyanate formed and in the presence of from about 0.1 to about 2.0 percent by weight, based on the weight of the polyisocyanate employed, of a catalyst selected from the group consisting of ferric chloride, aluminum chloride, and antimony trichloride.

2. The method of claim 1 wherein the said aromatic polyisocyanate is m-phenylene diisocyanate.

3. The method of claim 1 wherein the said chlorinated polynuclear aromatic solvent is chlorinated terphenyl having a chlorine content of about 60 percent by weight.

4. The method of claim 1 wherein the said chlorinated polynuclear aromatic solvent is chlorinated biphenyl having a chlorine content of about 68 percent by weight.

5. The method of claim 1 wherein the said aromatic polyisocyanate is m-phenylene diisocyanate and the said chlorinated polynuclear aromatic solvent is chlorinated terphenyl having a chlorine content of about 60 percent by weight.

6. A method for the preparation of a mixture of a perchlorinated aromatic polyisocyanate and a chlorinated polynuclear aromatic solvent which comprises reacting chlorine at a temperature of from about 100 to 250° C. with an aromatic polyisocyanate selected from the group consisting of phenylene diisocyanate, biphenylene diisocyanate and naphthalene diisocyanate, said reaction being conducted in the presence of from about 10 to about 1000 weight percent, based on the weight of the aromatic polyisocyanate, of a chlorinated polynuclear aromatic solvent having a chlorine content of at least 60 percent by weight and being selected from the group consisting of chlorinated biphenyl, chlorinated terphenyl and chlorinated naphthalene, and in the presence of from about 0.1 to about 2.0 percent by weight, based on the weight of the polyisocyanate employed, of a catalyst selected from the group consisting of ferric chloride, aluminum chloride and antimony trichloride.

7. The method of claim 6 wherein the said chlorinated polynuclear aromatic solvent is chlorinated terphenyl having a chlorine content of about 60 percent.

8. The method of claim 6 wherein the said aromatic polyisocyanate is m-phenylene diisocyanate.

References Cited

UNITED STATES PATENTS

| 3,102,875 | 9/1963 | Heiss | 260—77.5 |
| 3,210,395 | 10/1965 | McDougall | 260—453 |
| 3,255,226 | 6/1966 | McShane | 260—453 |
| 3,256,350 | 6/1966 | McCall et al. | 260—649 XR |
| 3,277,138 | 10/1966 | Hollschmidt et al. | 260—453 |

CHARLES B. PARKER, Primary Examiner

D. H. TORRENCE, Assistant Examiner

U.S. Cl. X.R.

260—2.5, 77.5, 566, 649, 694